United States Patent [19]

Coullerut et al.

[11] Patent Number: 4,972,128

[45] Date of Patent: Nov. 20, 1990

[54] DEVICE FOR THE SUPPLY OF A CONTINUOUS CURRENT ELECTRIC MOTOR, IN PARTICULAR FOR THE SUN ROOF OF AN AUTOMOTIVE VEHICLE

[75] Inventors: Jacques Coullerut, Seloncourt; Cuchet Daniel, Montbeliard, both of France

[73] Assignee: ECIA - Equipements Et Composants Pour L'Industrie Automobile, Audincourt, France

[21] Appl. No.: 425,136

[22] Filed: Oct. 23, 1989

[30] Foreign Application Priority Data

Oct. 24, 1988 [FR] France ................ 88 13891

[51] Int. Cl.⁵ .......................................... H02P 3/08
[52] U.S. Cl. ...................... 318/265.000; 318/266.000; 318/468.000
[58] Field of Search ............... 318/256, 257, 264, 265, 318/266, 268, 272, 282, 283, 286, 291, 293, 445, 466, 467, 468

[56] References Cited

U.S. PATENT DOCUMENTS

| | | | |
|---|---|---|---|
| 3,426,262 | 2/1969 | Colter ................................ | 318/257 |
| 3,851,235 | 11/1974 | Harrison ............................ | 318/257 |
| 4,001,661 | 1/1977 | Terabayashi ....................... | 318/264 |
| 4,272,708 | 6/1981 | Carle et al. ....................... | 318/286 X |
| 4,394,605 | 7/1983 | Terazawa ........................... | 318/291 X |
| 4,459,521 | 7/1984 | Barge ............................... | 318/445 X |
| 4,644,235 | 2/1987 | Ohta .................................. | 318/282 |
| 4,710,685 | 12/1987 | Lehnhoff et al. .................. | 318/286 |

*Primary Examiner*—Bentsu Ro
*Attorney, Agent, or Firm*—Sughrue, Mion, Zinn, Macpeak & Seas

[57] ABSTRACT

A device includes a Zener diode (2) and a resistor 3, for regulating a motor supply voltage, and switches (4, 5, 6) for controlling the operation of a motor and the inversion of the rotational direction of the motor, and is capable of being operated by the user. The device also includes: a transistor circuit (7, 10, 14) for regulating the rotational speed of the motor (1) as a function of the effort required by the motor, a portion of the transistor circuit being connected in series with the motor; and a relay (8) for short-circuiting the transistor circuit under the control of a sequencer or microprocessor (9) following a predetermined sequence.

5 Claims, 1 Drawing Sheet

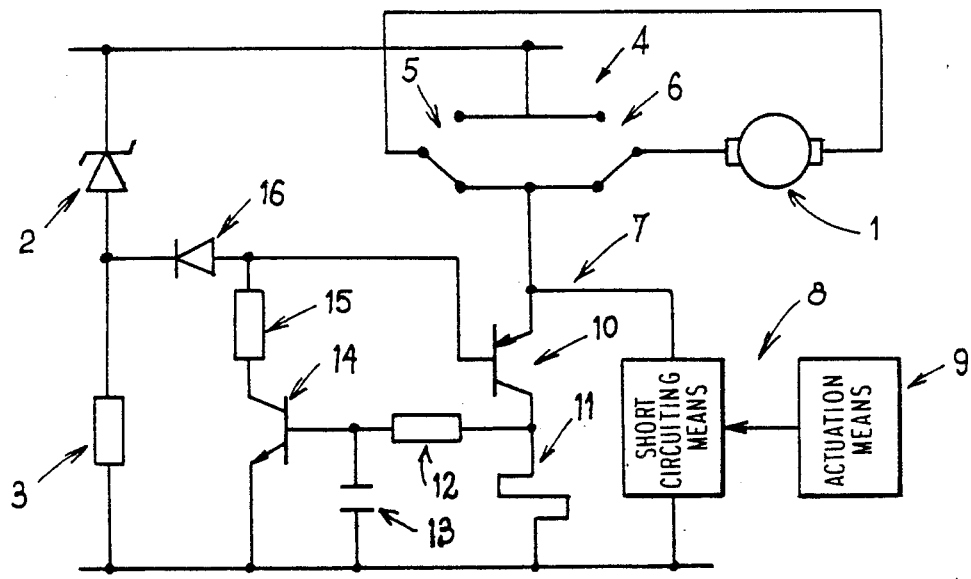

DEVICE FOR THE SUPPLY OF A CONTINUOUS CURRENT ELECTRIC MOTOR, IN PARTICULAR FOR THE SUN ROOF OF AN AUTOMOTIVE VEHICLE

BACKGROUND OF THE INVENTION

The present invention relates to a device for the supply of a continuous current electric motor, in particular for the sun roof of an automotive vehicle.

Devices of this type are already known in the state-of-the-art technology including means for regulating the supply voltage and means for controlling the operation of the motor and of the inversion of the rotational direction of the latter, capable of being operated by the user.

However, these devices have some inconveniences insomuch as the effort required of the motor varies as a function of a certain number of parameters in particular of the operation of the vehicle, such as its displacement speed.

It is thus that in some cases, for example when the displacement speed of the vehicle is relatively high, the effort required of the electric motor, for example to open the sun roof of this vehicle, is such that the motor heats up and the thermal protection trip means of the latter cut the supply to the motor.

SUMMARY OF THE INVENTION

The aim of the invention is therefore to resolve these problems by putting forward a device for supplying the motor which is simple, reliable, of a reasonable cost price and which allows the driving torque of the motor to be adapted in particular to the operating conditions of the vehicle and of the sun roof.

To this effect, the subject of the invention is a device for the supply of a continuous current electric motor, in particular for the sun roof of an automotive vehicle, including means for regulating the supply voltage and means for controlling the operation of the motor and of the inversion of the rotational direction of the latter, capable of being operated by a user, characterized in that it includes in addition means for regulating the rotational speed of the motor as a function of the effort required by the latter, connected in series with the motor, and means for short-circuiting the means of regulating the rotational speed of the motor under the control of means of activation following a pre-determined sequence.

BRIEF DESCRIPTION OF THE DRAWING

The invention will be better understood from the description which follows, given only as an example and made with reference to the attached drawing. FIGURE represents a synoptic diagram of a supply device according to the invention.

DETAILED DESCRIPTION OF A PREFERRED EMBODIMENT

As can be seen from this FIGURE, this device for the supply of a continuous current electric motor 1, in particular for the sun roof of an automotive vehicle, includes means for regulating the supply voltage, these regulating means comprising a Zener diode 2 in series with a resistor 3, connected between the two supply lines. Furthermore, the device according to the invention also includes means 4 for controlling the operation of the electric motor 1 and of the inversion of the rotational direction of the latter, these means comprising for example switches 5 and 6 capable of being operated by a user.

Furthermore, the device according to the invention also includes means 7 for regulating the rotational speed of the motor as a function of the effort required by the latter, these means being connected in series with the electric motor, and means 8 for short-circuiting the means for regulating the rotational speed of the motor under the control of means 9 of activation following a pre-determined sequence. It should be noted that the short-circuiting means can be constituted by any suitable element such as a relay or other device.

The means for regulating the rotational speed of the motor advantageously comprise a PNP transistor 10 of which the emitter-collector circuit is connected in series with a shunt 11 in the supply circuit of the motor. A resistor 12 and a condenser 13 are connected at the terminals of this shunt, adapted to bring about an average timing of the signal taken at the shunt terminals, the middle point between the resistor 12 and the condenser 13 being connected to the base of an NPN transistor 14 of which the emitter is connected to earth and of which the collector is connected to a terminal of a resistor 15.

The other terminal of this resistor 15 is connected on one hand to the anode of a diode 16, the cathode of which is connected to the middle point between the Zener diode 2 and the resistor 3 constituting the means for regulating the supply voltage, and on the other hand to the base of the PNP resistor 10 described previously, in such a way as to constitute the means for controlling the effort of the motor whatever the rotational direction of the latter.

In effect, the current circulating in the motor varies as a function of the effort required by the latter; the voltage at the terminals of the shunt, which is a reflection of this current, varies as a consequence and more or less controls the transistor 14 across the resistor 12 and the condenser 13, so as to more or less control the transistor 10 across the resistor 15 and so varies the rotational speed of the motor by varying the supply voltage of the latter.

It should be noted that the diode 16 constitutes means of protection of the Zener diode 2 by preventing any destructive increase of the voltage across the terminals of this diode.

However, there are cases where the regulation of the speed of the motor can be done away with when it is desired, for example, to obtain a fast opening or shutting for example of the sun roof of the vehicle, along a fixed course.

In this case, the means 9 of activation which can be constituted by any suitable element, such as a sequencer or a microprocessor, connected to the means of detecting the position of the sun roof, are adapted to control the short-circuiting means 8 so that the motor is supplied under full voltage so as to obtain full speed of the motor.

It goes without saying that these activation means can control the short-circuiting means following a pre-determined sequence, for example as a function of the type of vehicle, of the type of sun roof, of the displacement speed of the latter, etc.

What is claimed is:

1. In a device for supplying a continuous current to an electric motor for the sun roof of an automotive vehicle, said device including both voltage regulating means (2, 3), for regulating a motor supply voltage from a motor supply circuit, and also controlling means (4, 5, 6) for controlling the operation of the motor and the inversion of the rotational direction of the motor, said device being capable of being operated by user, the improvement comprising:

speed regulating means (7), for regulating the rotational speed of the motor as a function of the effort required by the motor, said speed regulating means being connected in series with the motor (1); and short-circuiting means (8), coupled to said speed regulating means, for short-circuiting said speed regulating means under control of activation means (9) following a predetermined sequence;

wherein the activation means (9) is connected to a means for detecting the position of the sun roof.

2. Device according to claim 1 wherein said speed regulating means (7) comprises a first transistor (10) and a shunt (11) which are connected in series in the motor supply circuit of the motor (1), a second transistor (14), for controlling the first transistor (10), being connected to terminals of the shunt (11).

3. Device according to claim 2 wherein said device further comprises averaging means (12, 13) adapted to bring about an average timing of a signal taken at the terminals of the shunt, the second transistor (14) being connected at the terminals of the shunt (11) across the averaging means.

4. In a device for supplying a continuous current to an electric motor for the sun roof of an automotive vehicle, said device including both voltage regulating means (2, 3), for regulating a motor supply voltage from a motor supply circuit, and also controlling means (4, 5, 6) for controlling the operation of the motor and the inversion of the rotational direction of the motor, said device being capable of being operated by a user, the improvement comprising:

speed regulating means (7), for regulating the rotational speed of the motor as a function of the effort required by the motor, said speed regulating means being connected in series with the motor (1); and short-circuiting means (8), coupled to said speed regulating means, for short-circuiting said speed regulating means under control of activation means (9) following a predetermined sequence;

wherein said speed regulating means (7) comprises a first transistor (10) and a shunt (11) which are connected in series in the motor supply circuit of the motor (1), a second transistor (14), for controlling the first transistor (10), being connected to terminals of the shunt (11); and wherein said device further comprises averaging means (12, 13) adapted to bring about an average timing of a signal taken at the terminals of the shunt, the second transistor (14) being connected at the terminals of the shunt (11) across the averaging means; and wherein said averaging means comprises a resistor (12) and a condenser (13) connected in parallel to the terminals of the shunt, a middle point between said resistor (12) and said condenser (13) being connected to the base of the second transistor (14), and the collector of the second transistor (14) being connected to the base of the first transistor (10) through a resistor (15).

5. Device according to claim 4 wherein the activation means (9) is connected to a means for detecting the position of the sun roof.

* * * * *